Oct. 10, 1961  W. J. McCARTY  3,003,408
DAMPER OPERATING ARRANGEMENT
Filed July 6, 1959
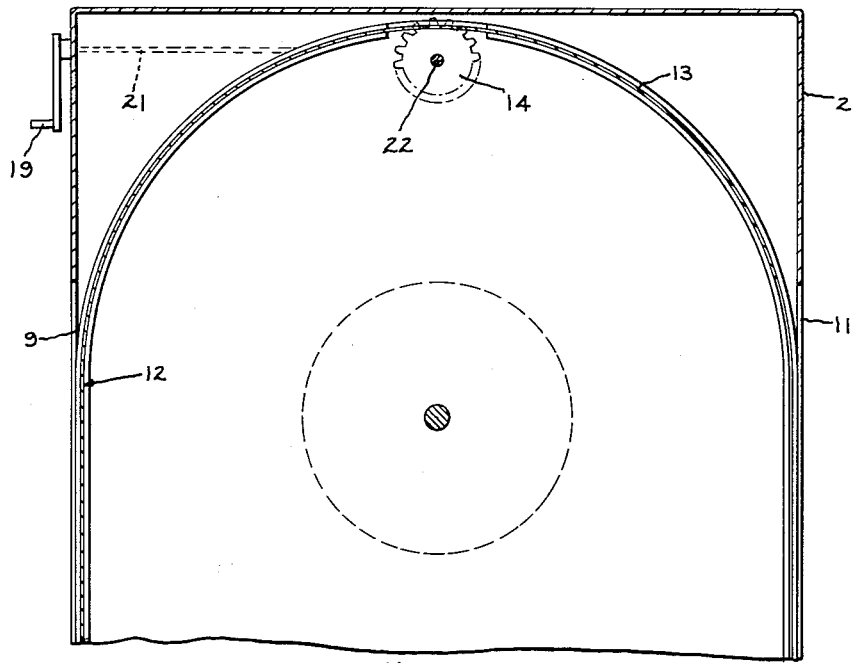
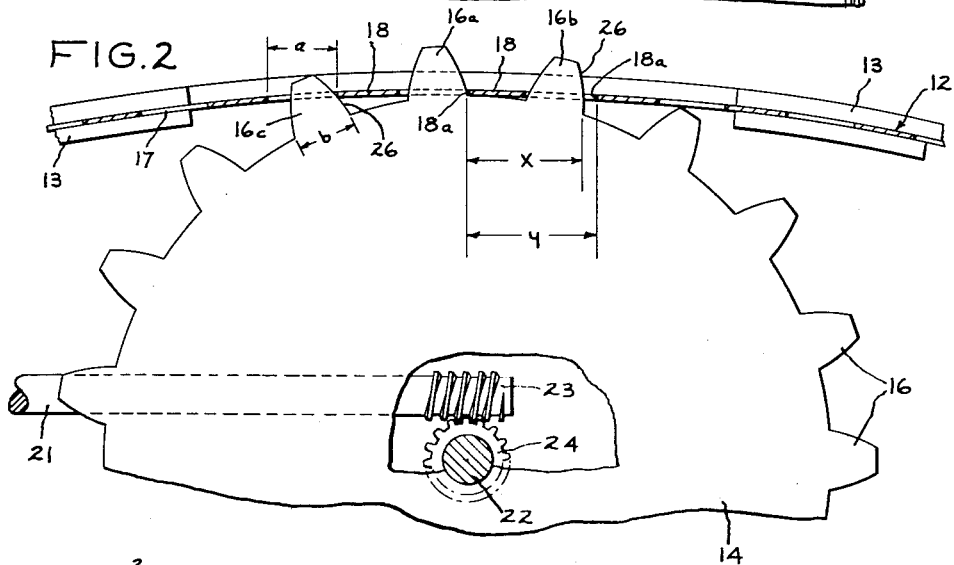
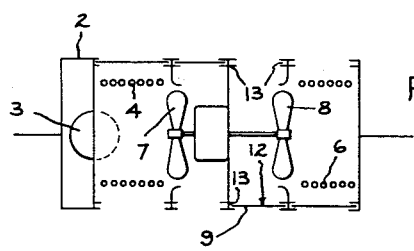
INVENTOR
WILLIAM J. McCARTY
BY
HIS ATTORNEY

United States Patent Office 3,003,408
Patented Oct. 10, 1961

3,003,408
DAMPER OPERATING ARRANGEMENT
William J. McCarty, Louisville, Ky., assignor to General Electric Company, a corporation of New York
Filed July 6, 1959, Ser. No. 825,064
1 Claim. (Cl. 98—33)

The present invention relates to and has for its principle object a new and improved damper operating arrangement for moving a thin flexible damper across an aperture in the wall or panel of a casing such as across the air inlet or outlet opening of an air conditioning casing.

In accordance with the present invention there is provided a flexible air damper which has two opposite edges inserted into grooves formed in a pair of parallel tracks disposed on opposite sides of an aperture in a panel. The damper is slidable along the tracks back and forth across the aperture for opening or closing the aperture. In order to drive the damper along the tracks there is provided a rotatable sprocket containing a number of gear teeth which fit into a plurality of aligned perforations in the damper and engage the edges of the perforations to drive the damper. The pitch of the gear teeth on the sprocket is made smaller than the distance between corresponding edges of adjacent perforations so that, during rotation of the sprocket, engagement of one gear tooth with the leading edge of one perforation causes the preceding gear tooth to disengage from the leading edge of the preceding perforation. In this manner each gear tooth is positively disengaged from the edge of the perforation in the damper before the tooth rotates downwardly away from the damper and thereby eliminates the snapping noise which otherwise results if the gear teeth are permitted to drag on the damper as they rotate downwardly.

For a better understanding of the invention, reference may be had to the accompanying drawings in which:

FIG. 1 is an elevation view of a casing having oppositely disposed apertures and a damper which is driven between the apertures by the damper operating arrangement of the present invention;

FIG. 2 is a greatly enlarged detail view of the sprocket driving mechanism illustrating the difference in length between the pitch of the gear teeth and the distance between corresponding edges of the gear driven perforations; and FIG. 3 is a diagrammatical plan view illustrating an air conditioner having a plurality of slidable dampers across the air openings for controlling the air flow therethrough.

Referring now to FIGS. 1 and 3 there is shown a casing 2 of an air conditioning unit of the type which is adapted for mounting in an outer wall of a room for conditioning the air of the room. The casing houses a refrigeration system including a compressor 3 and a pair of heat exchangers 4 and 6 connected in refrigerant flow relationship. On both sides of the casing 2 are provided openings to permit air to enter the casing from the room or from the outside. Air moving means or fans 7 and 8 are included within the casing for circulating separate streams of air from the room and from the outside respectively through the heat exchangers in the casing for conditioning the air of the room according to the desires of its occupants.

In order to control the air flowing through the openings in the sides of the casing the unit employs a plurality of adjustable dampers which are selectively adjustable across the air openings in the sides of the casings to open or close the openings. For example, referring to FIGS. 1 and 3, two openings 9 and 11 on opposite sides of the casing 2 are opened or closed by the thin semi-flexible damper 12 which may be moved in a manner to be hereinafter explained across either of these openings. The semi-flexible air damper 12 has its opposite edges fitted into grooved track members 13 which extend completely around the upper portion of the casing. The semi-flexible damper 12 is made of a thin sheet of material, such as steel or aluminum or some material which will not lose its resiliency due to temperatures ordinarily encountered in apparatus used for heating or cooling a room. The damper may be passed around curves which do not cause the material to bend beyond its elastic limit and which do not put a permanent set into the material. As may be seen in FIGS. 1 and 3, the tracks 13 extend downwardly into the casing along opposite sides of the openings 9 and 11 adjacent the edges of these openings. In order to retain the semi-flexible damper, the curved tracks 13 are grooved or formed in a substantially U-shaped cross section. These members support the edges of the dampers which are inserted into the groove or opening in the grooved track. The damper 12 is slidable within the grooves of the track members 13 and may be positioned across either of the openings 9 or 11 to restrict the air flowing through one or the other of these openings.

In order to drive the semi-flexible air dampers within grooved tracks 13 to various positions across the openings in the outer side walls of the casing 2, there is associated with each of the air dampers a drive sprocket 14 having a plurality of teeth 16 which fit within perforations 17 formed in the damper. This may be seen more clearly in FIG. 2. The drive sprocket 14 drives the damper 12 somewhat in the same manner as motion picture film is driven through a projector by the sprockets of the projector engaging the perforations in the outer edges of the film. These perforations in the damper 12, as in motion picture film, are disposed in alignment and arranged parallel to the edges of the damper which is retained in the grooved track members. Between each pair of perforations are links or cross members 18 which are an integral part of the damper. The gear teeth 16 engage the links 18 or, more specifically, the edges 18a of the links 18 which are, of course, the edges of the perforations 17, and drive the air valve in one direction or the other depending upon the direction of rotation of the sprocket 14.

Means is provided for rotating the sprockets 14 to move the dampers. In the illustrated embodiment of the invention, the sprocket rotating means includes a manually rotatable crank 19 and a control shaft 21 that may be rotated in one direction or the other by the occupant of the room. Rotation of the control shaft 21 imparts rotational movement to the sprocket shaft 22 through a worm 23 on the end of the control shaft 21 which engages a pinion gear 24 secured to the sprocket shaft 22.

Thus, by rotating the crank 19 and the rod 21 extending through the room side of the casing 2, the damper 12 in FIG. 1 is driven along the track members 13 to restrict the air flow through one or the other of the openings 9 or 11. Although the illustrated means for driving the sprocket is a manually operated crank and gear arrangement, it is to be understood that the sprocket could be driven by other means, such as by a reversible electrical motor which is properly geared to the sprocket shaft 22 and controlled by switches on the front of the case.

It has previously been stated that the damper 12 is driven by the sprocket 14 somewhat in the same manner as a motion picture film is driven by the sprocket of a projection machine. There are however some basic differences between the sprocket driving arrangement of the present invention, and the normal arrangements utilizing driving and driven gear members such as the gear and rack arrangement employed in driving motion picture film. In a normal gear driving arrangement it is desirable to make the pitch of the driven teeth equal to the pitch of the driving teeth so that the driving force will be transmitted to the driven member through a plurality of teeth on the driving member. This creates a certain amount of sliding action between the teeth of the two members during their engagement and disengagement. While this sliding action is permissible in many types of driving arrangements, such as that used to drive motion picture film, it is not practical for driving a thin semi-flexible damper for an air conditioner because the disengagement of the driving teeth 16 of the sprocket with the edges 18a of the perforations creates a very loud popping or rapping noise. This is caused because the semi-flexible damper is slightly deflected downwardly by the friction between the sliding tooth 16 and the edge 18a of the perforation and is suddenly released as the tooth continues to move downwardly around the sprocket. The sudden release of the deflected portion of the damper permits it to "snap" upwardly thereby creating a snapping noise that is amplified by the remaining portions of the damper which acts as a sounding board.

It was discovered that this snapping noise can be eliminated by making the pitch $x$ between the teeth 16 of the drive sprocket 14 less than the pitch or distance $y$ between the corresponding edges 18a of the perforations (or between the corresponding edges 18a of the links 18). In doing this it is necessary to make the length $a$ of the individual perforations 17 greater than the length $b$ of the individual gear tooth 16 at its base by at least an amount equal to the difference between the pitch $x$ of the teeth 16 and the distance $y$ between corresponding edges 18a. By making the pitch $x$ of the teeth 16 less than the pitch $y$ between corresponding edges 18a, each gear tooth is completely disengaged from the driven edge 18a of the respective perforation before the tooth rotates downwardly away from the damper. This is clearly illustrated in FIG. 2, where the driving edge 26 of the gear tooth 16b is completely disengaged from the edge 18a of its respective perforation. As the sprocket 14 is rotated clockwise, the driving edge 26 of the gear tooth 16c will cause the driving edge 26 of gear tooth 16b to be released from the edge 18a of its respective perforation 17. This action continues so that, although there is a great deal of sliding engagement between the gear teeth and the edges 18a on the damper as these members come into contact, these members are completely disengaged prior to the downward movement of each gear tooth.

In a tested embodiment of the invention in which the damper was made of sheet steel approximately .015 inch in thickness the popping or snapping noise was completely eliminated when the pitch between the teeth 16, or the distance $x$, was not greater than 98% of the distance $y$ or the pitch between corresponding edges 18a of the perforations.

By the present invention there has been provided, for sliding a damper across an opening in a panel, an arrangement utilizing a sprocket driving mechanism of the type similar to that employed for driving motion picture film through a projection machine. However, the arrangement of the present invention assures complete disengagement of the sprocket driving teeth from the damper prior to rotation of the teeth away from the damper and thereby reduces the noise of operation of the mechanism over that which occurs when the teeth are permitted to slidably disengage from the damper as they rotate away from it.

While in accordance with the patent statutes there has been described what at present is considered to be the preferred embodiment of the invention, it will be obvious to those skilled in the art that various changes and modifications may be made therein without departing from the invention and it is, therefore, the aim of the appended claim to cover all such changes and modifications as fall within the true spirit and scope of the invention.

What I claim as new and desire to secure by Letters Patent of the United States is:

A damper operating arrangement for an air conditioner comprising a casing having air openings on opposite sides thereof, curved track members attached to said casing adjacent the opposite edges of said openings and curved around the inner portions of said casing, longitudinal grooves in said curved track members on opposite edges of said openings, a flexible air damper having opposite edges thereof inserted in said grooved track members and adapted to slide back and forth between openings on opposite sides of said casing, a plurality of aligned gear tooth perforations disposed in said air damper parallel to the edges of said damper inserted into the grooved track members, said gear tooth perforations being equally spaced, said air damper assuming the curve of said curved track members during movement between said openings on opposite sides of said casing, a drive sprocket in the upper portion of said casing disposed adjacent said semiflexible damper on the concave side, said drive sprocket having gear teeth arranged to extend into said perforations in said flexible air valve to engage the edges of said perforations for driving said damper, said gear teeth having a pitch less than the linear distance between corresponding edges of two adjacent perforations so that engagement of one of said gear teeth with the edge of one perforation causes the preceding gear tooth to disengage from the edge of its respective perforation, and means for rotating said drive sprocket in either direction for selectively moving said air damper across said openings on either side of said casing.

References Cited in the file of this patent

UNITED STATES PATENTS

| | | |
|---|---|---|
| 2,373,496 | Paiste | Apr. 10, 1945 |
| 2,668,684 | Metzger | Feb. 9, 1954 |
| 2,891,576 | Kennedy | June 23, 1959 |

FOREIGN PATENTS

| | | |
|---|---|---|
| 632,014 | Great Britain | Nov. 15, 1949 |
| 950,048 | Germany | Oct. 4, 1956 |